United States Patent [19]
Manzella

[11] Patent Number: 5,732,663
[45] Date of Patent: Mar. 31, 1998

[54] STRETCH LEASH

[76] Inventor: Joseph Manzella, 7220 8th Ave., NW., Bradenton, Fla. 34209

[21] Appl. No.: 756,825

[22] Filed: Nov. 26, 1996

[51] Int. Cl.⁶ ............................................. A01K 27/00
[52] U.S. Cl. ...................................................... 119/798
[58] Field of Search ................................. 119/798, 792, 119/795, 797, 771

[56] References Cited

U.S. PATENT DOCUMENTS

| | | | |
|---|---|---|---|
| 2,821,168 | 1/1958 | Forbes | 119/109 |
| 3,884,190 | 5/1975 | Gurrey | 119/109 |
| 4,317,257 | 3/1982 | Engel | 17/21 |
| 4,513,692 | 4/1985 | Kuhnsman et al. | 119/109 |
| 4,570,577 | 2/1986 | Bellinger | 119/102 |
| 4,993,366 | 2/1991 | Sager | 119/109 |
| 5,033,409 | 7/1991 | Sabot | 119/29 |
| 5,146,876 | 9/1992 | McPhail | 119/109 |
| 5,291,856 | 3/1994 | Goller | 119/109 |
| 5,375,561 | 12/1994 | Gundersen | 119/771 |
| 5,611,540 | 3/1997 | Williams et al. | 473/429 |

*Primary Examiner*—Thomas Price
*Attorney, Agent, or Firm*—Patent & Trademark Services; Thomas Zack; Joseph H. McGlynn

[57] ABSTRACT

A stretchable pet leash made of a bungee cord material. Loops forming the hand harness and the means to attach a collar clip are at opposite ends of the leash. Stainless steel wire bindings may encircle the free ends of each loop where it is parallel to the leash's material to hold it thereto. The collar clip may be attached to a pet's collar and the leash material may be made by either the rubber or plastic by the extrusion process.

5 Claims, 1 Drawing Sheet

5,732,663

STRETCH LEASH

BACKGROUND OF THE INVENTION

Anyone who has ever walked a leashed pet, especially a dog, knows that there is a certain amount of non directed pulling by the animal to go to a place just beyond the leash's full length. This may require the pet's owner or walker to offer counter resistance or to take unwanted extra steps in the pulled direction. The present invention seeks to overcome these disadvantages by providing for a pet's stretch leash which will allow the pet a greater amount of movement while it still remains leashed.

DESCRIPTION OF THE PRIOR ART

Many of types of prior art pet leashes are known. For example, in U.S. Pat. No. 2,821,168 to Forbes a fabric leash for animals is disclosed which will lessen injury due to cutting of the hands by the leash line. The Gurrey invention (U.S. Pat. No. 3,884,190) describes a self-coiling leash made of music wire with a flexible sheath. While the Kuhnsman et al. U.S. Pat. No. 4,513,692 is a illuminate able pet leash with a fiber optics. In U.S. Pat. No. 5,291,856 to Goller a section of the leash adjacent the distal end is stiffened or reinforced to minimize the affixed leash's tendency to be entangled. The present invention differs from this art and the known prior art by providing for an animal leash made of material which will stretch substantially beyond its non tensioned length as set forth in the specification.

SUMMARY OF THE INVENTION

The described invention is a stretch leash for pet animals. A hand harness is at one end of the leash while a conventional pet collar clip is at its other end. The flexible leash can be made of a bungee like cord material which is wrapped at its two end into a circular configuration around itself and held by a moisture resistant metallic wire binding.

It is the primary object of the present invention to provide for an improved pet leash.

Another object is to provide for a leash for animals which can be stretched lengthwise substantially beyond its non tensioned state.

These and other objects and advantages of the present invention will become apparent to readers from a consideration of the ensuing description and the accompanying drawings.

DESCRIPTION OF THE PREFERRED EMBODIMENT

Figure 1:
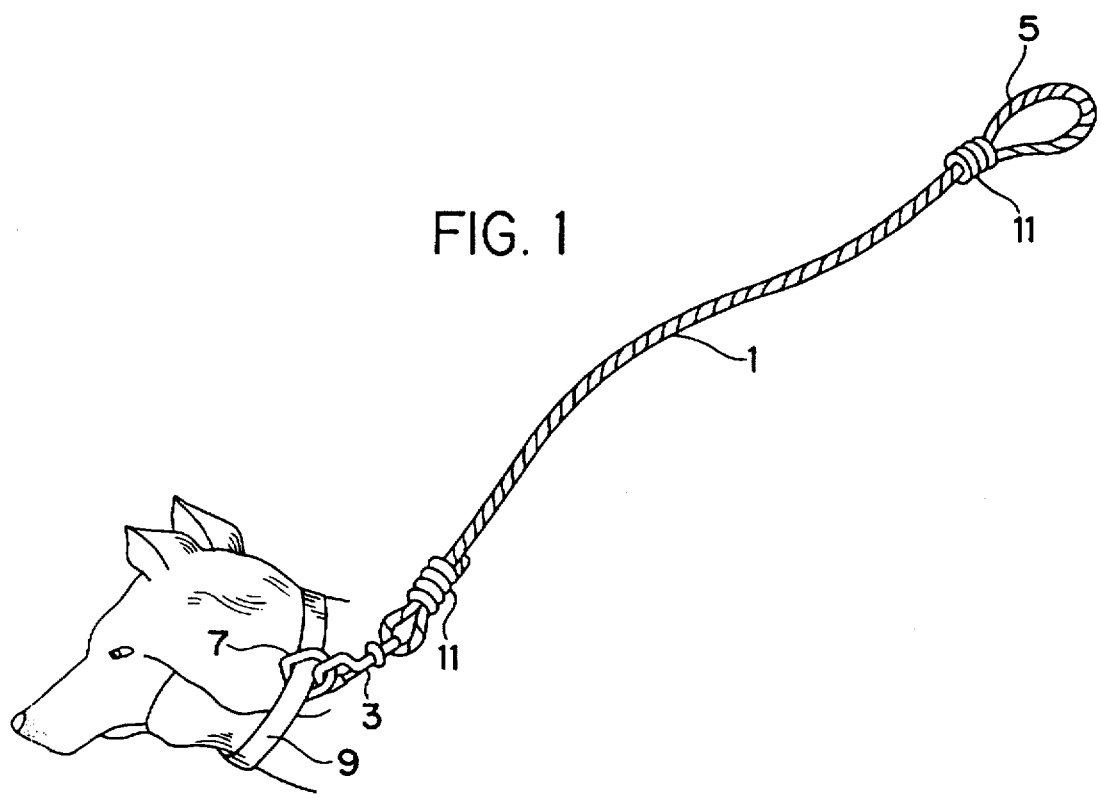
FIG. 1 is a perspective view of the leash in its non tensioned state with a collar clip at one end and a hand harness at the other end.

FIG. 1 is a perspective view of the flexible elongated leash 1 in its non tensioned state with a pet collar clip 3 at one end and a looped hand harness 5 at the other end. The collar clip is a conventional leash clip and may be either one that its opened by moving a leaf spring or one that is opened by retracting a biased bolt with a finger. In any event, the collar clip can be attached to the collar U-shaped clip 7 on the pet's collar 9.

The leash 1 is usually about 3 to 5 feet in non-tensioned length and approximately ¼ and ½ inches or more in diameter. It can be made of a variety of bungee like materials which when subjected to a pulling tension will stretch lengthwise substantially beyond their original non-tensioned length. It many cases this tensioned stretched length can be at least thirty percent more than the non-tensioned length. Normally a high density rubber bungee cord material is used for the leash. This very stretchable material not only allows the tethered animal a greater amount of freedom but, it also can be used by the harness holder to participate in wrist and arm exercises while walking the pet. Both the clip 3 and hand harness 5 and held to the leash by the same type of attachment 11. It is important to note that this invention is designed to provide enjoyment to its user while not choking the dog or cat's neck or jerking the user's arm or shoulder. In this way it aids in the walking of pets especially for elderly and handicapped people.

Figure 2:
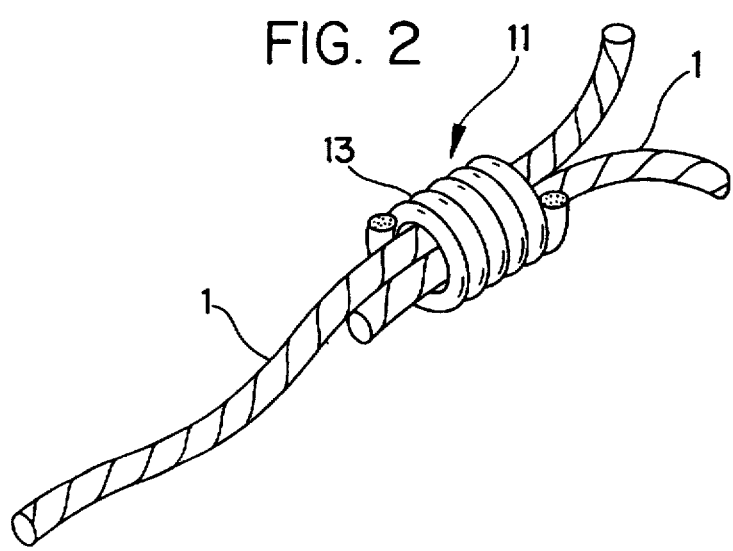
FIG. 2 is an enlarged perspective view of the two end binding attachments.

FIG. 2 is an enlarged perspective view of the two end binding attachments 11. At each leach end the bungee cord material is looped around itself such that its free end will lie parallel to the leash's major length. To hold these two parallel lengths of leash material together a wound stainless steel wire binding 13 encircles the parallel ends of the formed loop. At the hand harness end 5 the formed loop may be larger to accommodate the hand of a user while the loop at the collar clip's end is usually smaller. Typically this smaller loop would fit through an eye hook in the collar clip 3. To insure moisture resistance both the collar clip 3 and attachment binding 13 should be made of a suitable moisture resistant metallic material such as stainless steel or nickel plated metal.

The bungee cord leash material can be manufactured using high density rubber or plastic rubber like stretchable material using the rubber or plastic extrusion process. The plastic or rubber extrusion process is one whereby molten, heat softened plastic or rubber is forced under high pressure through a die, similar to toothpaste being squeezed through the hole in the tube, (in this example the hole in the tube is the die). The material forms a continuous length in the shape of the die it was squeezed through. In other words the plastic or rubber would come out continually in the shape of a rod using the nozzle of the toothpaste tube as a die, but would come out in the shape of a square if the die were square. In this case the plastic/rubber extrusion would take on the shape of the leash sections. Many familiar parts you deal with on a weekly basis were more than likely extruded. For example, plastic molding, door thresholds, plastic straws and similar items are all manufactured using the extrusion process. The basic bungee material required to manufacture the stretch leash, as well as the other metallic components, such as the collar clip 3 and woven binding 13, are available as off the shelf components or items. The Thomas Register is a good source for locating commercial suppliers for such components.

Although the stretch leash and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A stretch leash for pet animals comprising:
   a flexible elongate leash made of a bungee cord material having a hand harness at one end;

means for permitting the attachment of the leash to a pet's collar clip at the leash's other end; and said hand harness and means for permitting the attachment of lease to a pet's collar each have loops formed by wrapping the leash's bungee cord material into a loop whose free ends are parallel to the leash and held thereto by a moisture resistant metallic wire binding.

2. The invention as claimed in claim 1, also including a pet collar clip and collar to which said means for permitting attachment of the leash can be affixed to guide a tethered pet.

3. The invention as claimed in claim 1, wherein said leash's bungee cord material is made by the extrusion process.

4. The invention as claimed in claim 1 wherein said moisture resistant metallic wire binding is a stainless steel wire binding.

5. The invention as claimed in claim 1, wherein said bungee cord leash material can be elongated to at least thirty percent more than its non-tensioned length by an attached pet placing sufficient tension on the leash.

* * * * *